Jan. 16, 1951  A. W. GUTHRIE  2,538,153
SPIN CASTING REEL
Filed Oct. 8, 1948

INVENTOR.
ALVIN W. GUTHRIE,
BY
McMorrow, Berman & Davidson
ATTORNEYS.

Patented Jan. 16, 1951

2,538,153

UNITED STATES PATENT OFFICE 2,538,153

SPIN CASTING REEL

Alvin W. Guthrie, Chicago, Ill.

Application October 8, 1948, Serial No. 53,493

5 Claims. (Cl. 242—84.4)

My invention relates to fishing reels of the type known as spin casting reels.

An object of the invention is to provide an improved spin casting reel which includes a line stop selectively engageable with the line to limit stripping of the line from the spool as desired, such line stop being readily releasable from the line without delay so as to permit the additional stripping of the line from the spool when desirable.

Another object is to provide an improved spin casting reel including means for reeling the line onto the spool.

A further object is to provide an improved spin casting reel including novel means for reeling the line upon the spool, and a line stop selectively engageable with the line to prevent or permit, as desired, stripping of the line from the spool.

Other objects and advantages reside in the particular structure of the invention, the structure of the several elements comprising the same, and the combination and arrangement of such elements, all of which will be readily apparent to those skilled in the art upon reference to the attached drawing, in connection with the following specification, wherein the invention is shown, described and claimed.

Figure 2:
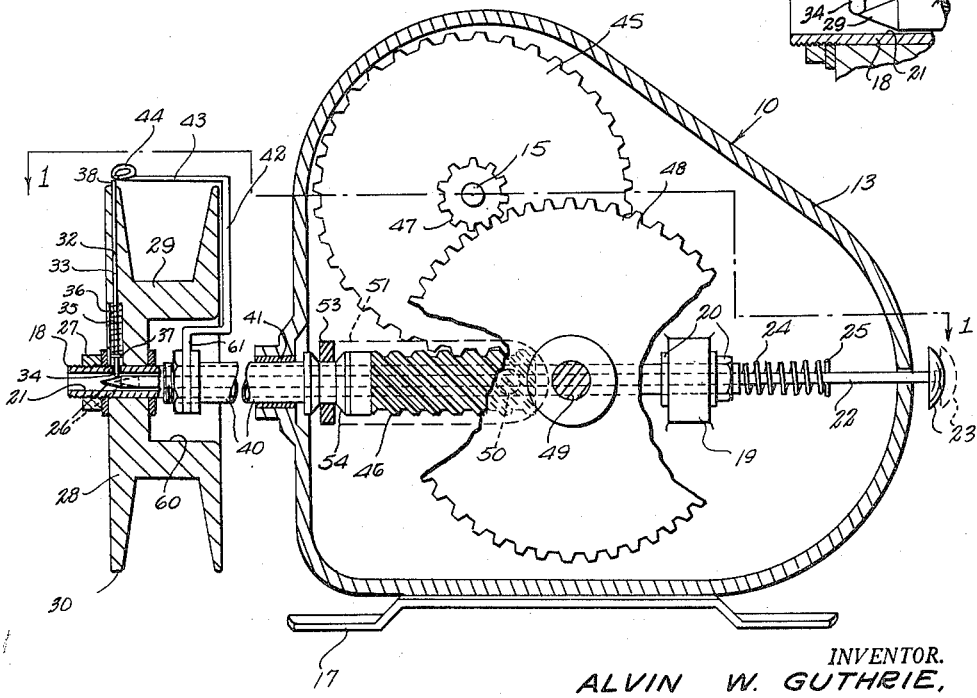
Figure 2 is a longitudinal vertical sectional view, parts being broken away and parts being shown in elevation.

Referring specifically to the drawing, wherein like reference characters have been used throughout the several views to designate like parts, 10 designates generally any suitable gear housing which preferably includes a pair of parallel side walls 11 and 12 connected together in spaced relation by a peripheral wall 13. In practice, the peripheral wall 13 may be an integral portion of the side wall 11 and the wall 12 may be detachably secured thereto in any suitable manner, as by the machine screws or the like 14. A drive shaft 15 extends transversely across the housing 10 and may be journaled in the side walls 11 and 12. One end of the drive shaft 15 may extend outwardly of the side wall 11 and have a crank 16 detachably secured thereto for rotating the drive shaft in a well known manner. As best seen in Figure 2, any suitable means, such as the base 17, may be provided on the peripheral wall 13 for detachably securing the housing 10 to a fishing pole, not shown.

Figures 1, 3:
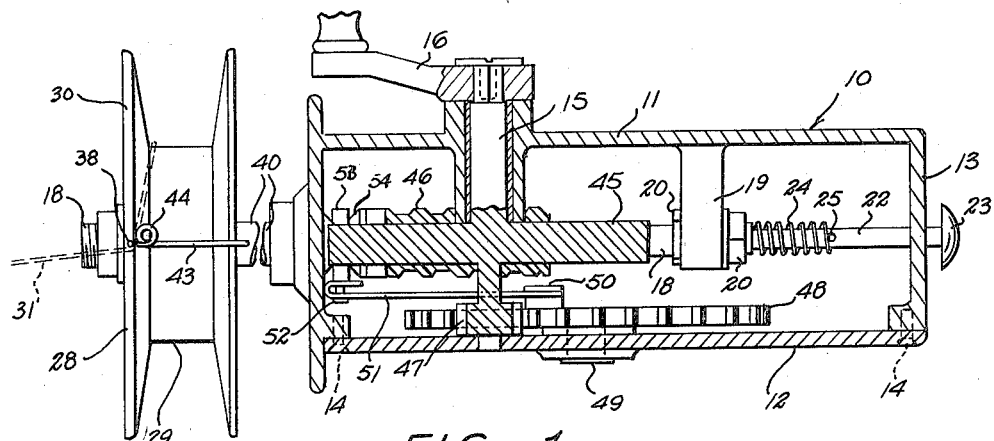
Figure 1 is a horizontal sectional view through a reel according to the invention, parts being broken away and parts being shown in plan, and taken substantially on the planes of the lines 1—1 of Figure 2.
Figure 3 is a fragmentary vertical section showing a portion of Figure 2 on an enlarged scale.

An axle 18 extends longitudinally of the housing 10 in transverse and vertically-spaced relation to the drive shaft 15. The rear end of the axle 18 may be secured to any suitable means, such as the boss 19, interiorly of the housing 10 by any suitable means, such as the lock nuts 20. The front end of the axle 18 is supported by means to be described later. The axle 18 is formed with an axial bore 21 which is open at both ends and which slidably mounts therein a plunger 22. The plunger 22 includes a rear end slidable through an opening in the peripheral wall 13 and formed to provide a thumb piece or button 23 outwardly of the housing 10. A coil spring 24 is concentrically disposed about the plunger 22 rearwardly of the rearmost lock nut 20 and bearing thereagainst. The rear end of the spring 24 bears against any suitable abutment 25 fixed to the plunger 22. Thus, the coil spring 24 loads the plunger 22 in a retracted position relative to the axle 18. The plunger 22 includes a pointed forward end 26 providing a cam. As best seen in Figure 2, the spring 24 loads the plunger 22 to the broken line position, but the same is readily advanceable to the full line position and beyond by pressing on the thumb piece or abutment 23. The forward end of the axle 18 extends outwardly of the housing 10, as shown, and has fixed thereon in any suitable manner, as by the lock nut 27, a spool 28. The spool 28 includes a hub 29 about which fishing line, shown at 31, Figure 1, is adapted to be wound in a well known manner. Likewise, the casting side of the spool 28 is provided with a substantially annular bearing 30 which slidably engages the line 31 as the same is stripped off the spool in casting.

To prevent unrestricted stripping of the line 31 from the hub 29 of the spool, there has been provided the line stop now to be described. Such line stop is slidable in a radially-disposed passage or slideway 32 formed in the spool and intersecting the bore 21 of the axle 18 and also the bearing 30. A pin 33 is slidable in the passage or slideway 32 and includes an inner end 34 providing a cam finger which normally projects into the bore 21 of the axle 18 so as to be engaged by the cam 26 of the plunger 22. Any suitable means, such as the spring 35 may be provided in the passage 32 in operative engagement with the pin 33 so as to load the same to the inoperative position wherein the inner end 34 projects into the bore 21. Thus, the spring 35 may be located in a radially-disposed counterbore of the passage 32 and may bear against any suitable washer or cross-pin 37 fixed to the pin 33. The upper end 38 of the pin 33 is normally retracted radially inwardly of the bearing 30 so as to permit free stripping of the line 31 from the spool 28. However, when the plunger 22 is advanced in the bore 21, the cam 26 of the plunger engages the cam finger 34 of the pin 33, whereby to move the pin radially outwardly in the passage 32 so that the line stop 38 is projected radially outwardly of the bearing 30. When this occurs, the line 31 will engage the stop 38 to prevent further stripping of the line from the spool. Thus, at the completion of a cast or just prior to making the cast, the angler may advance the plunger 22 with this thumb, whereby to prevent free stripping of the line from the spool. Moreover, by maintaining the plunger advanced, no accidental stripping of the line from the spool is possible, while awaiting a bite. At the same time, as soon as a fish strikes the bait, the angler may release pressure on the plunger 22 to permit the same to be retracted whereby the line stop 38 is simultaneously retracted to permit free stripping of the line from the spool in the event the fish is to be allowed to run with the bait. The reel in the line, after the fish is satisfactorily hooked, means now to be described have been provided. Thus, a sleeve 40 is slidable and rotatable on the axle 18 and includes a forward end extending forwardly through the peripheral wall 13 of the housing 10. Any suitable bearing 41 may be provided in the forward portion of the wall 13 to slidably and rotatably support the forward end of the sleeve 40. Likewise, it should be noted that the forward end of the axle 18 is supported inwardly of the forward end of the sleeve 40. A combined line guide and line-reeling device is fixed to the forward end of the sleeve 40 in any suitable manner and may comprise a radially-directed portion 42 and a forwardly-directed portion 43 overlying the reel or spool 28. An eye 44 is formed in the forward end of the portion 43 and is adapted to be readily detachably connected to the fishing line 31 in a well known manner to permit reeling of the line about the hub 29 of the spool upon rotation of the sleeve 40. To provide an even winding of the line, means have been provided for reciprocating the sleeve on the axle 18 so that the line is guided axially along the hub 29 of the spool as it is reeled thereon.

A helical drive gear 45 is fixed to the drive shaft 15 inwardly of the housing and is in operative engagement with an elongated driven helical pinion 46 fixed to the sleeve 40. Thus, as the crank 16 is rotated to drive the drive shaft 15 and gear 45, the sleeve 40 is likewise rotated with the line-reeling and guide member so that the fishing line 31 is reeled onto the spool 28. To reciprocate the sleeve 40, there has been provided a drive pinion 47 which is fixed on the drive shaft 15 adjacent the wall 12 of the housing. The drive pinion 47 is operatively meshed with a driven gear 48 journaled on a stub shaft 49 fixed to the wall 12 of the housing. The driven gear 48 includes a crank pin 50 which is pivoted on one end of a pitman 51. The forward end of the pitman 51 is pivotally connected, as at 52, Figure 1, to a yoke 53 which embraces a clutch collar 54 formed in the sleeve 40 forwardly of the driven helical pinion 46. It should be noted that the connection or gear train 47 and 48 comprises reduction gearing, whereby the driven gear 48 is rotated at a relatively slower speed than the drive shaft 15. Likewise, it is apparent that as the sleeve 40 is rotated by the gearing 45 and 46, it is simultaneously reciprocated by the gearing 47, 48 and the pitman 51. Thus, the line guide and reeling device is reciprocated axially of the spool 28 simultaneously with being rotated thereabout to wind the line thereon. To provide a compact device and yet permit reciprocation of the sleeve 40 relative to the spool 28, the inner side of the spool 28 is provided with a counterbore 60 concentrically of the sleeve and receiving the forward end of the sleeve therein. Likewise, the inner end of the arm 42 may be forwardly offset, as at 61, to be received in the counterbore 60.

While I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. In a spin casting reel, the combination with a spool for coiled line and an annular bearing on the casting side of said spool for engagement with said line as the same is stripped from said spool, of a line stop carried by said spool, said spool being formed with an axial bore and a radially-directed slideway intersecting said bore and bearing, a pin slidable in said slideway, said pin including an outer end providing said line stop and an inner end providing a cam finger, a cam slidable in said bore, a spring loading said pin in a radially-inward direction so as to project said cam finger thereof into said bore and retract said line stop radially inwardly of said bearing, and means for advancing said cam into engagement with said cam finger whereby to project said line stop radially outwardly of said bearing to prevent stripping of said line from said spool.

2. A spin casting reel, comprising a hollow gear housing, a stationary axle fixed in said housing and including an outer end projecting outwardly of said housing, a spool fixed to said outer end of said axle, a rotatable sleeve telescopically embracing said axle and axially slidable thereon, said sleeve including an outer end projecting outwardly of said housing, a member providing a combined line-reeling device and line guide fixed to said outer end of said sleeve for sliding and rotating movement therewith, said member including a line-engaging arm overlying said spool, gears in said housing, means for rotating said gears, means operatively coupling said gears to said sleeve so as to rotate and reciprocate the same simultaneously on said axle, said axle being formed with an axial bore, a plunger axially slidable in said bore, said plunger including a rear end projecting rearwardly of said housing and providing a thumb piece, a spring loading said plunger to a retracted position, said plunger including a front end providing a cam, said spool being formed with an annular bearing adapted to engage a fishing line as the latter is stripped from said spool, said spool being formed with a radial passage intersecting said bearing and bore, a pin slidable in said passage, said pin including an inner end normally projecting into said bore and an outer end normally disposed in said passage radially inwardly of said bearing, and said plunger being adapted to be advanced to cause said cam to engage said inner end of said pin and project said outer end thereof radially outwardly of said bearing to provide a line stop.

3. In a spin casting reel, the combination with a spool for a coiled line and an annular bearing on the casting side of said spool for engagement with said line as the same is stripped from said spool, of a line stop positioned radially of said spool within said bearing and mounted in the latter for movement into and out of extended and retracted positions with respect to the periphery of said bearing, resilient means operated connected to said spool and said line stop for biasing the latter out of its extended position, and hand actuable means slidably supported within said spool and engageable with said line stop for effecting the movement of the latter into its extended position.

4. A spin casting reel comprising a hollow gear housing adapted to be secured longitudinally of a fishing rod, a hollow axle extending longitudinally of said housing having one end fixedly secured within the latter and having the other end extending through a wall of the housing, a spool for coiled line positioned transversely of said housing and secured to said other end of said axle, said spool comprising an annular bearing on the casting side thereof for engagement with said line as the same is stripped from said spool, line stop means positioned radially of said spool within said bearing and engageable with said line as the same is stripped from said spool, a sleeve circumposed about said axle and rotatably and slidably supported on the latter, a combined line reel and guiding device positioned transversely of said spool adjacent the periphery thereof and operatively connected to said sleeve, and means disposed within said gear housing and operatively connected to said sleeve for simultaneously effecting rotary and reciprocating movement of the latter.

5. A spin casting reel comprising a hollow gear housing adapted to be secured longitudinally of a fishing rod, a hollow axle extending longitudinally of said housing having one end fixedly secured within the latter and having the other end extending through a wall of said housing, a spool for coiled line positioned transversely of said housing and secured to said other end of said axle, said spool comprising an annular bearing on the casting side thereof for engagement with said line as the same is stripped from said spool, a line stop positioned radially of said spool within said bearing and mounted in the latter for movement into and out of extended and retracted positions with respect to the periphery of said bearing, resilient means operatively connected to said spool and said line stop for biasing the latter out of its extended position, hand actuable means slidably supported within said spool and engageable with said line stop for effecting the movement of the latter into its extended position, a sleeve circumposed about said axle and rotatably and slidably supported on the latter, a combined line reel and guiding device positioned transversely of said spool adjacent the periphery thereof and operatively connected to said sleeve, and means disposed within said gear housing and operatively connected to said sleeve for simultaneously effecting rotary and reciprocating movement of the latter.

ALVIN W. GUTHRIE.

REFERENCES CITED

The following references are of record in the file of this patent:

UNITED STATES PATENTS

| Number | Name | Date |
| --- | --- | --- |
| 2,492,587 | Ledingham | Dec. 27, 1949 |

FOREIGN PATENTS

| Number | Country | Date |
| --- | --- | --- |
| 354,960 | Great Britain | Aug. 20, 1931 |
| 686,697 | Germany | Jan. 15, 1940 |
| 878,594 | France | Oct. 19, 1942 |
| 887,877 | France | Aug. 23, 1943 |